Nov. 7, 1961   J. E. HAFNER ET AL   3,007,220
SELF-APPLYING RELEASABLE CORD FASTENER
Filed Jan. 26, 1959

INVENTORS
JOHANN E. HAFNER
WESLEY S. LARSON
BY
*Lindsey and Prutzman*
ATTORNEYS

United States Patent Office 3,007,220
Patented Nov. 7, 1961

3,007,220
SELF-APPLYING RELEASABLE CORD FASTENER
Johann E. Hafner and Wesley S. Larson, Hazardville, Conn., assignors to The Hartford Company, East Hartford, Conn., a corporation of Connecticut
Filed Jan. 26, 1959, Ser. No. 788,945
3 Claims. (Cl. 24—126)

This invention relates to an improved releasable cord fastener for adjustably securing two cords or cord ends together and particularly to such a fastener of the self-applying type.

The principal object of this invention is the provision of a compact, rugged device for securing two cord ends so as to prevent inadvertent opening of a container such as a laundry bag.

It is a further object of this invention to provide a cord fastener that easily accommodates irregularities in a cord without diminishing the fastening effect.

It is an additional object of this invention to provide a device for holding the drawstring of a laundry bag in the closed position, such a device being highly resistant to corrosion by strong cleaning agents while being economical to manufacture and simple and effective to operate.

It is a still further object to provide a plastic cord fastener comprising two basic unitary elements that are easily assembled but which are not disassembled by normal use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
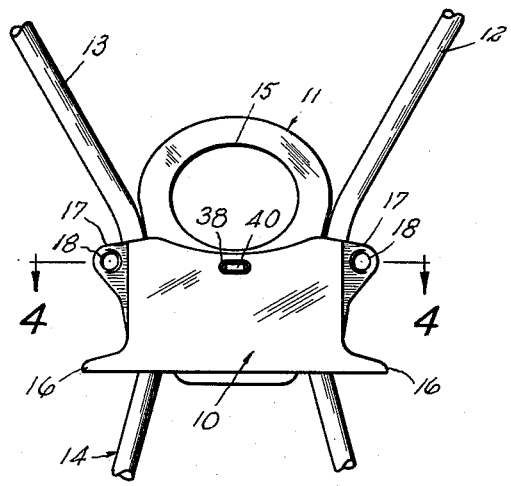
FIG. 1 is a front plan view of a preferred embodiment of the cord fastener of this invention.

Referring to the drawings, it is seen that the fastener of this invention generally comprises a housing 10 and a slide 11 which cooperate to prevent withdrawal of the ends 12 and 13 of cord 14. In a typical application, cord 14 is utilized as the drawstring for a conventional laundry bag (not shown) and would be in the form of a continuous loop. Slide 11 is provided with a central aperture 15 through which a finger may be inserted to partially withdraw slide 11 from housing 10 as hereinafter explained. The aforementioned partial withdrawal is facilitated by the provision of outwardly extending side abutments 16 and 17 which cooperate with the sides of housing 10 to provide a convenient and comfortable place for the user to grip the housing to operate the fastener. Each abutment 17 is provided with an aperture 18 through which an identifying tag can be fastened.

Figure 2:
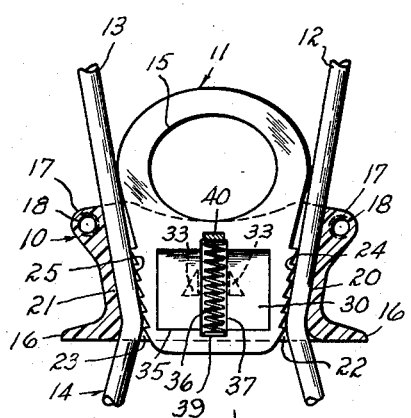
FIG. 2 is a partially cut-away front view of the fastener of FIG. 1.

As most clearly seen in FIG. 2, slide 11 is generally wedge shaped and cooperates with inwardly converging inner sidewalls 20 and 21 of housing 10 to define two cord-receiving channels 22 and 23 within the fastener. Side edges 24 and 25 are provided with serrations or teeth having a rearward facing rake so that movement of cord 14 in the direction of the arrow tends to increase the wedging action of slide 11 relative to housing 10 and prevent movement of the fastener in a direction that would permit opening of the laundry bag. That is, movement of slide 11 into housing 10 reduces the cross section of the passageways 22 and 23 so as to tightly grasp the cord.

Figure 3:
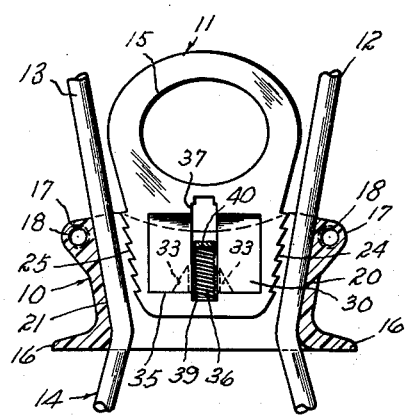
FIG. 3 is a partially cut-away front view of the fastener of FIG. 1.
Figure 4:
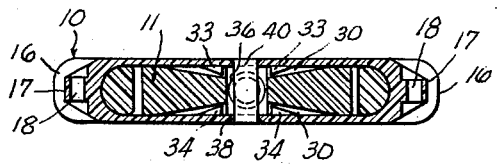
FIG. 4 is a cross-section view of the fastener taken generally along the lines 4—4 of FIG. 1.

In the preferred embodiment, housing 10 and slide 11 are one-piece structures molded from a plastic that is unaffected by strong laundry chemicals. As seen in FIGS. 2, 3 and 4, the front and back of slide 11 are provided with a central recess 30 and housing 10 is provided with a pair of detent abutments 33 and 34 on the inner surface of the front and back of the housing. The detents are tapered in lateral and longitudinal cross section to facilitate insertion of slide 11 into housing 10 by distorting housing 10 with a cam action but to prevent complete withdrawal therefrom during normal operation by the interference engagement of the detents with the top front edges 35 and the bottom front edge (not shown) of the recesses (see FIG. 3). That is, detents 33 and 34 increase in longitudinal cross section in the direction of insertion of slide 11 into housing 10. Thus, although the basic structure comprises two unitary pieces, the fastener is easily assembled but cannot be disassembled during normal usage.

To insure positive functioning of the fastener and therefore positive wedging engagement of the cord between the teeth along sides 24 and 25 of slide 11 and the inwardly converging sidewalls 20 and 21 of housing 10, a spring 36 is mounted in longitudinal slot 37 of slide 11. After slide 11 has been inserted in housing 10, pin 40 is inserted through apertures 38 of housing 10 and the upper end of slot 37 in slide 11. Spring 36 thus acts against end 39 of slot 37 and pin 40 which is carried by housing 10 thereby urging slide 11 into housing 10 and into intimate wedging engagement with cord 14.

When it is desired to loosen the fastener to open an associated container such as a laundry bag, it is merely necessary to grasp housing 10 between the abutments 16 and 17 with one hand and to place a finger of the other hand into aperture 15 of slide 11 and to pull slide 11 against the force of spring 36 to partially withdraw slide 11 to the position shown in FIG. 3 wherein detents 33 and 34 engage top edge 35 and the bottom edge (not shown) of recesses 30. The fastener can then be freely moved relative to cord 14.

To reclose the laundry bag, it is merely necessary to release slide 11 and to slide the fastener along cord 14 and away from ends 12 and 13. Thus unidirectional sliding movement is permitted by the rearward rake of the teeth 24 and 25 on slide 11 and serves to close the bag.

As is apparent from the foregoing description, slide 11 can move longitudinally and pivotally about pin 40. This movement not only permits movement of slide 11 to release the fastener, but also permits slide 11 to shift pivotally to accommodate irregularities in cord 14 which would otherwise impair the holding action of the fastening device.

The fastener of this invention has a minimum number of parts which are ideally suited to use in the environment of strong laundry chemicals without impairing their function. The device is economical to manufacture as well as simple to use while providing effective fastening action.

As will be apparent to persons skilled in the art, various modifications and adaptations of the structure above described will become readily apparent without departure from the spirit and scope of the invention, the scope of which is defined in the appended claims.

We claim:

1. A unidirectional cord fastener for adjustably securing two cord ends together comprising a plastic housing having a through aperture formed therein and having opposed inwardly converging inner sidewalls, a plastic wedge-shaped slide received within said aperture and having rearwardly raked teeth formed thereon along the sides facing the inwardly converging housing walls, the toothed sides of said slide cooperating with the inwardly converging inner housing sidewalls to define two cord receiving passageways that are reduced in width by movement of the slide into the housing, said slide having a longitudinal slot formed therein, a coil spring disposed in the slot in said slide, a pin extending into the slot in said slide and supported at its ends by said housing thereby to urge said slide into said housing, said slide having a recess formed therein, and a tapered detent formed in a wall of said housing opposite said recess and cooperating therewith, said detent increasing in longitudinal cross section in the direction of insertion of said slide into said housing and extending into said recess thereby to permit insertion of said slide into said housing but to prevent withdrawal of said slide therefrom.

2. A unidirectional cord fastener for adjustably securing two cords together comprising a plastic housing having a through aperture formed therein and having opposed inwardly converging inner sidewalls, a plastic wedge-shaped slide received within said aperture and having rearwardly raked teeth formed thereon along the sides facing the inwardly converging housing walls, the toothed sides of said slide cooperating with the inwardly converging inner housing sidewalls to define cord receiving passageways that are reduced in width by movement of the slide into the housing, there being a central longitudinal slot in said slide, a coil spring disposed therein and engageable with said housing to urge said slide into said housing, said slide having a recess formed therein a tapered detent formed in a wall of said housing opposite said recess and cooperating therewith, said detent increasing in longitudinal cross section in the direction of insertion of said slide into said housing and extending into said recess thereby to permit insertion of said slide into said housing but to prevent withdrawal therefrom.

3. The unidirectional cord fastener as set forth in claim 2 wherein a portion of said slide extends outside of said housing and is provided with an aperture through which a finger may be inserted to withdraw the slide against the spring bias, and a pair of outwardly extending abutments are provided on each side of said housing to facilitate grasping of the housing to permit withdrawal of the slide.

References Cited in the file of this patent

UNITED STATES PATENTS

| | | |
|---|---|---|
| 545,760 | Ashley | Sept. 3, 1895 |
| 2,200,895 | Rio | May 14, 1940 |
| 2,443,335 | Vogel | June 15, 1948 |
| 2,854,718 | Viola | Oct. 7, 1958 |